(12) United States Patent
DeJesus

(10) Patent No.: US 10,569,851 B1
(45) Date of Patent: Feb. 25, 2020

(54) DUAL BLADE ASSEMBLY PROPELLER

(71) Applicant: Ben L. DeJesus, Carson, CA (US)

(72) Inventor: Ben L. DeJesus, Carson, CA (US)

( * ) Notice: Subject to any disclaimer, the term of this patent is extended or adjusted under 35 U.S.C. 154(b) by 0 days.

(21) Appl. No.: 16/158,837

(22) Filed: Oct. 12, 2018

(51) Int. Cl.

| | | |
|---|---|---|
| *B63H 5/10* | (2006.01) | |
| *B63H 1/20* | (2006.01) | |
| *B63H 1/26* | (2006.01) | |
| *B64C 11/48* | (2006.01) | |
| *B64C 11/18* | (2006.01) | |
| *F03D 3/06* | (2006.01) | |
| *F03D 3/00* | (2006.01) | |
| *B64C 11/10* | (2006.01) | |

(52) U.S. Cl.
CPC ............. *B63H 5/10* (2013.01); *B63H 1/20* (2013.01); *B63H 1/26* (2013.01); *B64C 11/10* (2013.01); *B64C 11/18* (2013.01); *B64C 11/48* (2013.01); *F03D 3/005* (2013.01); *F03D 3/061* (2013.01); *B63H 2005/103* (2013.01); *F05B 2240/211* (2013.01); *F05B 2240/30* (2013.01)

(58) Field of Classification Search
CPC ... B63H 1/00; B63H 1/20; B63H 1/26; B63H 5/00; B63H 5/10; B63H 5/16; B63H 20/00; B63H 20/12; B63H 20/16; B63H 1/12

USPC ............... 416/200 R; 440/75, 80, 81
See application file for complete search history.

(56) References Cited

U.S. PATENT DOCUMENTS

| | | | | |
|---|---|---|---|---|
| 917,206 | A * | 4/1909 | Watts ................. | B63H 1/12 416/200 R |
| 1,363,660 | A * | 12/1920 | La Fleur ............. | B63H 1/20 416/200 R |
| 1,710,562 | A * | 4/1929 | Alessi ................. | B63H 5/16 440/81 |
| 2,736,537 | A * | 2/1956 | Nelsson ............. | B01F 7/00341 416/200 R |
| 9,541,060 | B1 | 1/2017 | DeJesus | |

* cited by examiner

*Primary Examiner* — Lars A Olson
(74) *Attorney, Agent, or Firm* — Morland C. Fischer

(57) ABSTRACT

Disclosed is a propeller having at least first and second blade assemblies located one above the other. Each of the blade assemblies has a plurality of blades that extend radially outward from a shaft. The shaft can be coupled to a suitable land, sea or air vehicle (e.g., a ship). The blades of the first blade assembly lie above and alternate out of phase with the blades of the second blade assembly. Each of the blades of the first and second blade assemblies slopes downwardly relative to the shaft such that the leading sides thereof are located lower along the shaft than the opposite trailing sides. The blades of the first blade assembly are aligned with respective ones of the blades of the second blade assembly to establish substantially continuous and long downwardly sloping surface areas capable of maximizing the propulsion force generated by the propeller.

10 Claims, 5 Drawing Sheets

DUAL BLADE ASSEMBLY PROPELLER

BACKGROUND OF THE INVENTION

1. Field of the Invention

This invention relates to a propeller having at least first and second (i.e., dual) blade assemblies located one above the other and extending outwardly from a shaft that is coupled, for example, to a vehicle to propel the vehicle through a fluid medium (e.g., water or air). The first and second blade assemblies have pluralities of (e.g., three) flared blades that are spaced around the shaft so as to alternate out of phase with one another in order to maximize a propulsion force generated by the propeller.

2. Background Art

Air, sea and even land vehicles are known to be driven by means of at least one propeller assembly. The conventional propeller assembly typically has a single set of blades that are spaced from one another around a shaft. A rotation of the shaft is imparted to the blades to cause a rotation thereof which, in turn, generates a propulsion force to be applied to the vehicle to which the shaft is coupled. In many cases, the single set of propeller blades of the conventional propeller assembly are disposed in a common plane. It is now desirable to improve the efficiency of the conventional propeller assembly as just described by means of a dual blade assembly propeller having first and second sets of sloping propeller blades that are attached to a shaft with one set of blades being spaced above and located out of phase with respect to the other set of blades. The set of propeller blades of the first blade assembly is sloped towards and aligned with the set of propeller blades of the second blade assembly in a manner that is adapted to maximize the propulsion force generated and the volume of fluid pushed by the dual blade assembly propeller relative to the aforementioned conventional propeller assembly having only a single set of blades.

My U.S. Pat. No. 9,541,060 issued Jan. 10, 2017 describes one example of a compound blade assembly having one blade assembly lying above and spaced from a second blade assembly. In this example, the pair of blade assemblies are attached to a rotatable shaft to establish a windmill for generating electricity when the shaft is rotated.

SUMMARY OF THE INVENTION

Briefly, and in general terms, a dual blade assembly propeller is disclosed to provide a propulsion force for ideally driving a vehicle (e.g., a ship or a drone) through a fluid medium (e.g., water or air). The dual blade assembly propeller includes at least first and second blade assemblies that are fixedly connected to and extend radially outward from a shaft by means of respective cylindrical hubs. Each blade assembly has a plurality (e.g., three) generally triangular blades that flare outwardly from their hubs to resemble an arc of a circle. The first blade assembly is located along the shaft so as to be spaced from the second blade assembly such that the blades of the first blade assembly lie above and alternate (e.g., 60°) out of phase with the blades of the second blade assembly.

Each of the blades of the first and second blade assemblies slope downwardly relative to the shaft to which they are connected. In particular, the blades of the first blade assembly are located above and aligned with respective ones of blades of the second blade assembly to establish a substantially continuous and relatively long downwardly sloping surface area to maximize the propulsion force to be generated by the dual blade assembly propeller. Each one of the blades of the first and second blade assemblies has a leading side and an opposite trailing side. To further enhance the ability of the dual blade assembly propeller to drive a vehicle with which it is associated, the outermost tip of the leading side of one blade from the first blade assembly lies in close proximity to and almost touching the outermost tip of the trailing side of one blade from the second blade assembly. Accordingly, a triangular air or water flow space is established between the aforesaid leading and trailing sides of each pair of adjacent blades of the first and second blade assemblies lying one above the other so as to reduce drag when a vehicle is being driven by the propeller. In this same regard, the trailing side of the one blade from the first blade assembly lies above and in parallel alignment with the leading side of an adjacent different blade from the second blade assembly, whereby to enable the dual blade assembly propeller to push a greater volume of fluid than a conventional propeller assembly having only a single set of blades.

DESCRIPTION OF THE PREFERRED EMBODIMENT

Figure 1:
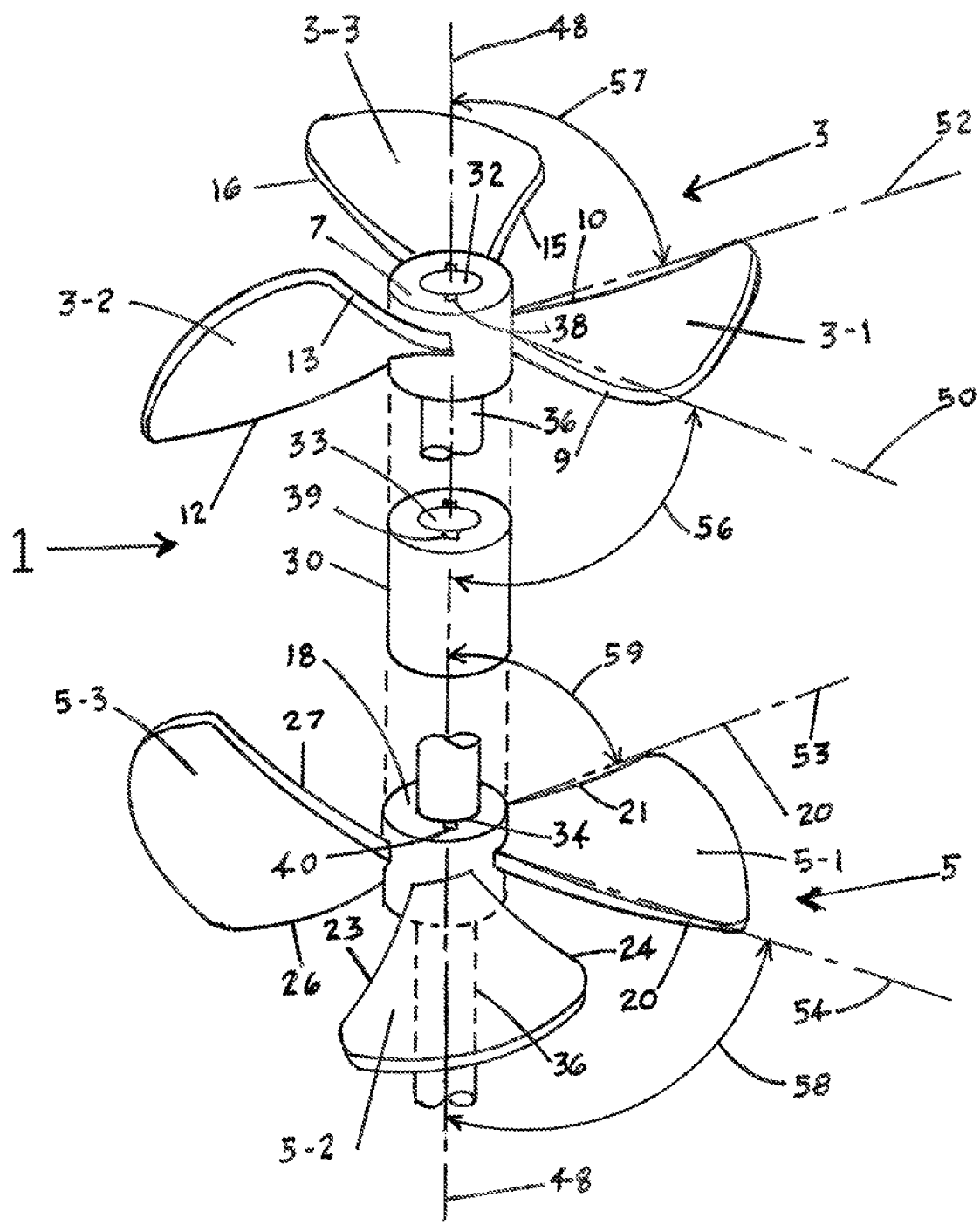
FIG. 1 shows an exploded perspective view of a preferred embodiment for a multi-blade assembly propeller having first and second blade assemblies positioned one above the other and extending radially from a shaft.

Referring initially to FIGS. 1-5 of the drawings, there is shown a dual blade assembly propeller 1 according to a preferred embodiment of my invention. The propeller 1 has at least one pair of blade assemblies 3 and 5 with each assembly having a plurality of (e.g., three) blades, where one of the pair of blade assemblies 3 is positioned above the second blade assembly 5. In this regard, it is within the scope of this invention for the propeller 1 to have more than the pair of blade assemblies 3 and 5 as shown and for each blade assembly to have more than three blades. As will soon be described when referring to FIG. 6, the dual blade assembly propeller 1 herein disclosed has particular application to be coupled to the rear of a boat to provide the power necessary to drive the boat through the water in which it is located. However, it is to be understood that my propeller 1 can also be used to propel vehicles other than a boat through a fluid (e.g., air) medium.

As explained above, the first of the pair of blade assemblies 3 of propeller 1 preferably has a total of three blades 3-1, 3-2 and 3-3. Each of the blades 3-1, 3-2 and 3-3 has an outwardly flared triangular shape to resemble an arc of a circle with a narrow inner end affixed to a cylindrical upper hub 7 and a relatively wide, curved outer end. Each of the blades 3-1, 3-2 and 3-3 has opposite leading and trailing sides 9 and 10, 12 and 13, and 15 and 16, respectively, that run from the upper hub 7 to the curved outer end thereof. The opposing leading and trailing sides of each blade flare radially outward from the upper hub 7 so that an angle of about 60 is established therebetween. Therefore, a rotation of the upper hub 7 of the dual blade assembly propeller 1 imparts a corresponding simultaneous rotation to the blades 3-1, 3-2 and 3-3 of the first blade assembly 3.

Likewise, the second of the pair of blade assemblies 5 of the propeller 1 preferably has a total of three blades 5-1, 5-2 and 5-3. As in the case of the blades 3-1, 3-2 and 3-3 of the first blade assembly 3, each of the blades 5-1, 5-2 and 5-3 has a triangular shape and resembles an arc of a circle with a narrow inner end affixed to a cylindrical lower hub 18 and a relatively wide, curved outer end. Each of the blades 5-1, 5-2 and 5-3 has opposite leading and trailing sides 20 and 21, 23 and 24 and 26 and 27, respectively, that run from the lower hub 18 to the curved outer end thereof. The opposing leading and trailing sides of each blade flare radially outward from the lower hub 18 so that an angle of about 60° is established therebetween. Therefore, a rotation of the lower hub 18 of the dual blade assembly propeller 1 imparts a corresponding simultaneous rotation to the blades 5-1, 5-2 and 5-3 of the second blade assembly 5.

The first and second blade assemblies 3 and 5 of the dual blade assembly propeller 1 are spaced one above the other by means of a cylindrical sleeve 30 that is located between the upper and lower hubs 7 and 18. Each of the cylindrical upper hub 7 of the first blade assembly 3, the cylindrical lower hub 18 of the second blade assembly 5, and the cylindrical intermediate sleeve 30 has a respective cylindrical hole 32, 33 and 34 running longitudinally therethrough. In order to hold the upper and lower blade assemblies 3 and 5 one above the other, the cylindrical holes 32-34 running through the blade assemblies 3 and 5 and the intermediate sleeve 30 are axially aligned, and a cylindrical shaft 36 is received therethrough. As will be explained when referring to FIG. 6, the dual blade assembly propeller 1 is carried by the shaft 36 so that a rotational force applied to the shaft 36 is imparted to the propeller. In this same regard, the propeller 1 can be coupled by the shaft 36 to the rear of a ship or to any other suitable sea, air or land vehicle in need of propulsion through a fluid medium (e.g., water or air) or over land.

As is best shown in FIG. 1, each of the upper and lower hubs 3 and 5 and the intermediate shaft 36 lying therebetween has a respective pair of keyways 38, 39 and 40 extending radially outwardly and in opposite directions from the cylindrical holes 32, 33 and 34 thereof. The pairs of keyways 38, 39 and 40 are also axially aligned one above the other, and a corresponding pair of elongated keys (designated 42 and 43 in FIG. 4) are received therethrough so as to prevent a rotation of one of the upper and lower blade assemblies 3 and 5 relative to the other around the shaft 36.

Figure 5:
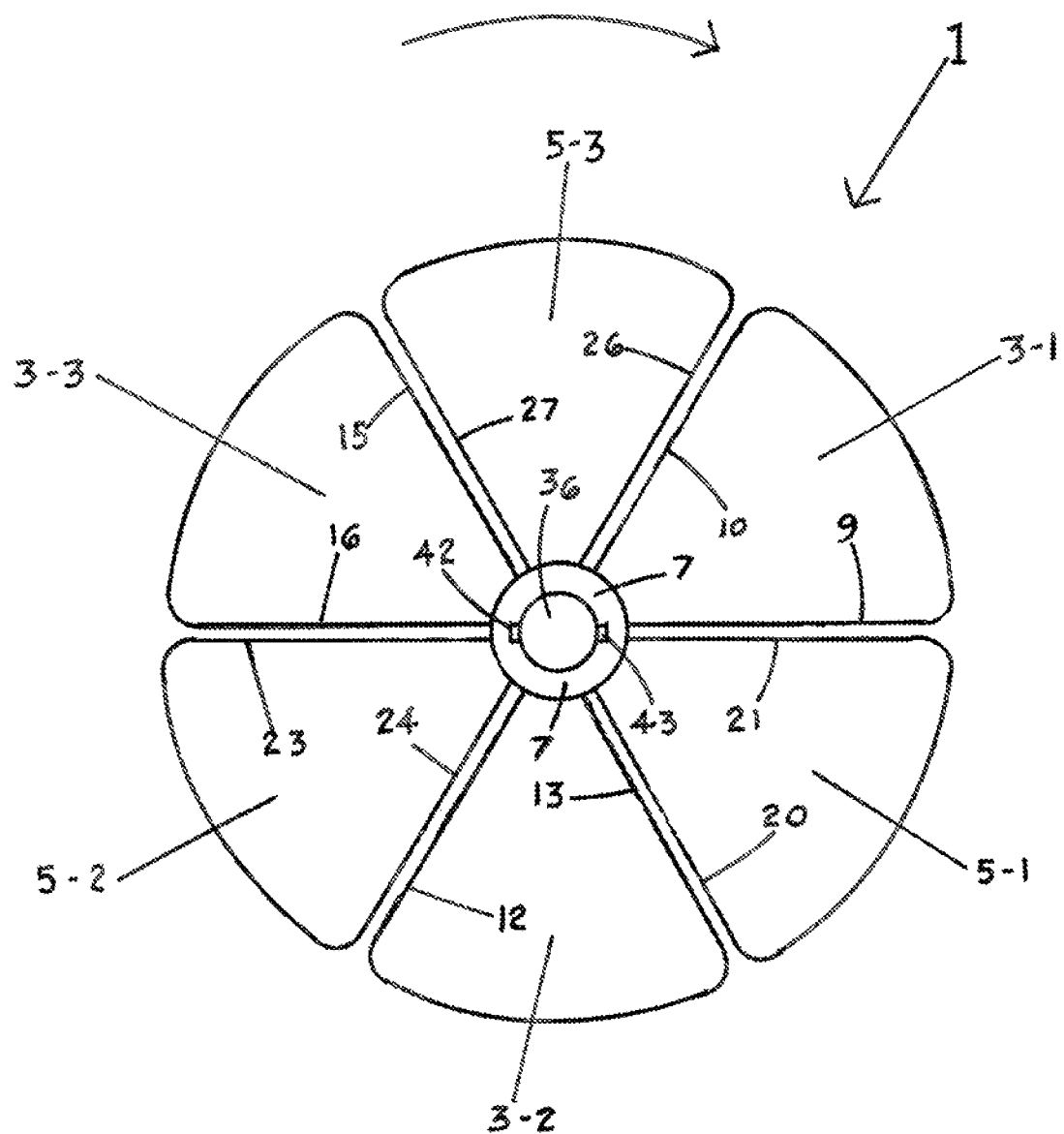
FIG. 5 is a top plan view of the multi-blade assembly propeller looking down along lines 5-5 of FIG. 2.

Moreover, and referring specifically to FIG. 5, there is shown the ideal positions of the first and second blade assemblies 3 and 5 of the propeller 1 lying one above the other along the shaft 36. The center lines of each one of the three blades 3-1, 3-2 and 3-3 of the first blade assembly 3 and each one of the three blades 5-1, 5-2 and 5-3 of the second blade assembly 5 are equally spaced and separated from adjacent ones of the blades by an angle of 120°. The blades of first blade assembly 3 are 60° out of phase and alternate with the blades of the second blade assembly 5. As was just explained, the locations of the first and second blade assemblies 3 and 5 carried by the shaft 36 and the alternating alignment of the blades 3-1, 3-2 and 3-3 of the first assembly 3 relative to and lying above the blades 5-1, 5-2 and 5-3 of the second assembly 5 are preserved by the receipt of the elongated keys 42 and 43 through respective ones of the axially aligned sets of keyways 38, 39 and 40.

Figure 2:
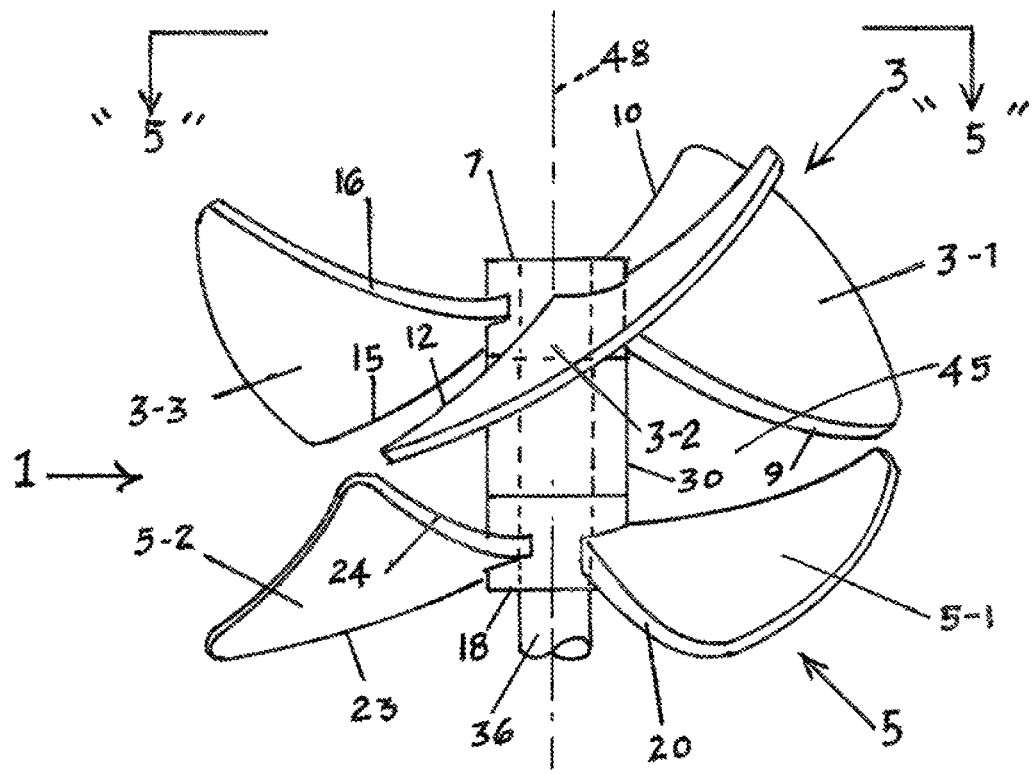
FIG. 2 is a side view of the multi-blade assembly propeller shown in FIG. 1.
Figure 3:
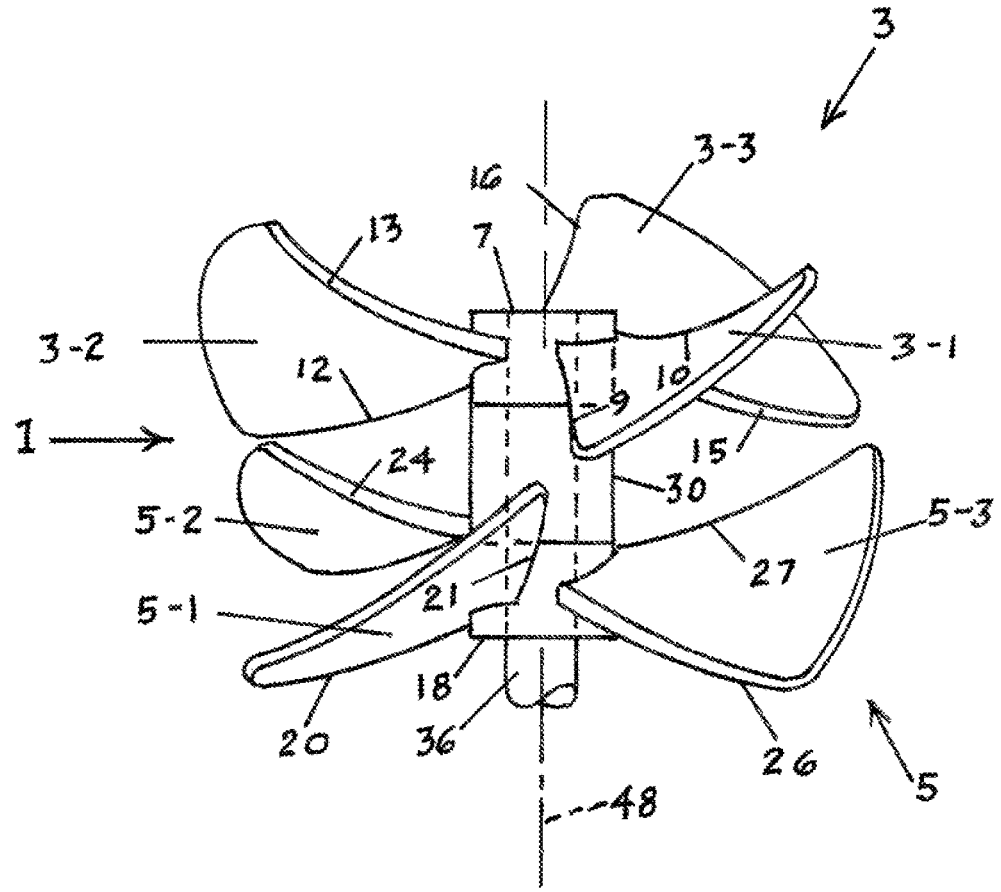
FIG. 3 is a front view of the multi-blade assembly propeller.

With the first and second blade assemblies 3 and 5 being held in place one above the other along the shaft 36 so that the blades 3-1 . . . 3-3 and 5-1 . . . 5-3 thereof alternate out of phase with respect to one another in the manner shown in FIG. 5, additional details of the dual blade assembly propeller 1 are now disclosed while referring to FIGS. 2 and 3. In particular, each of the triangular blades of each blade assembly 3 and 5 preferably has a curved or bowed surface that slopes downwardly with respect to the shaft 36. Therefore, the leading sides 9, 12 and 15 of the downsloping blades 3-1 . . . 3-3 of the first blade assembly 3 lie below the trailing sides 10, 13 and 16. Likewise, the leading sides 20, 23 and 26 of the downsloping blades 5-1 . . . 5-3 of the second blade assembly 5 lie below the trailing sides 21, 24 and 27.

Figure 4:
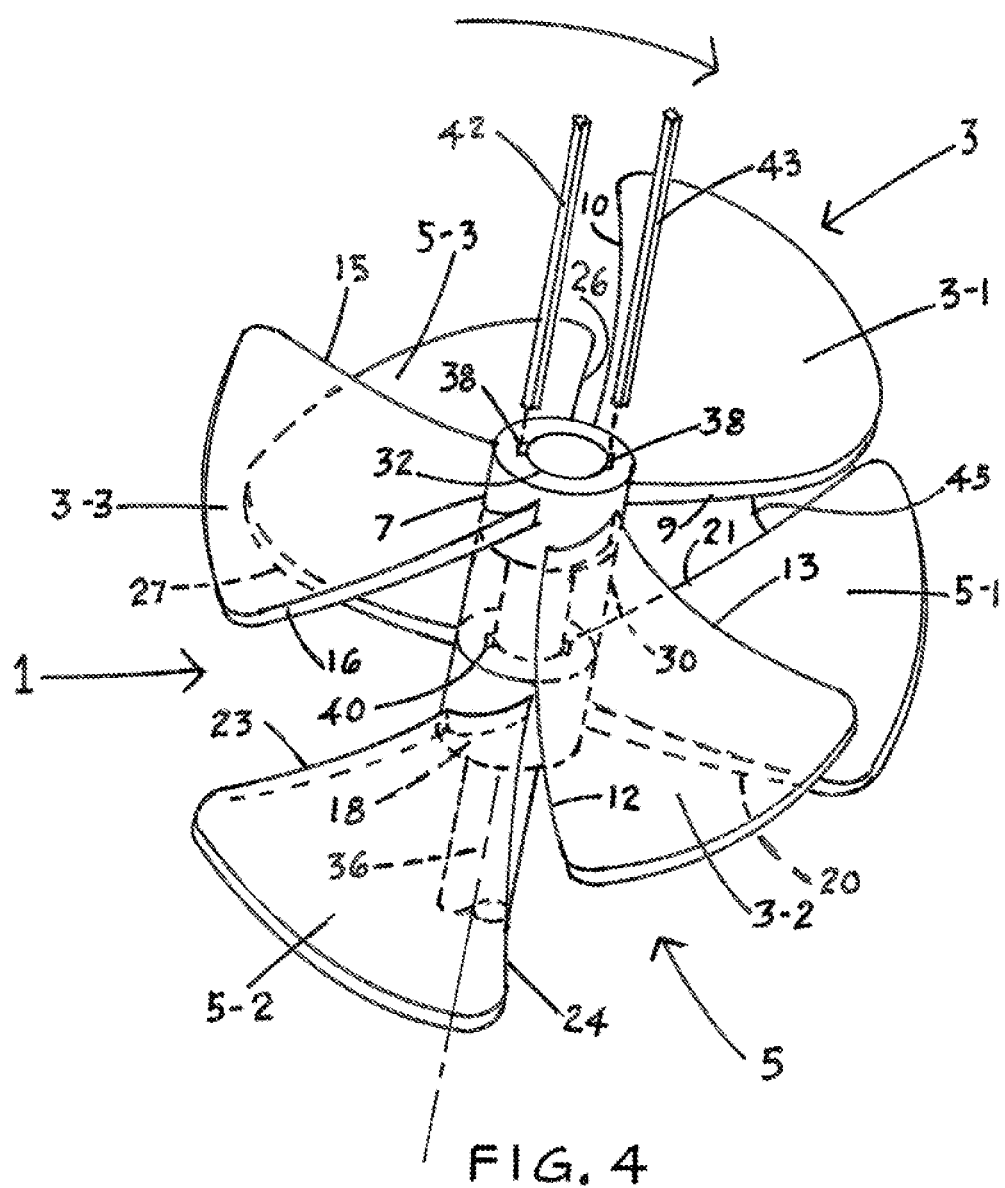
FIG. 4 shows a perspective view of the multi-blade assembly propeller of FIG. 1 having an assembled configuration.

Moreover, each sloping blade (e.g., 3-1 of FIG. 3) of the first blade assembly 3 is located above and aligned with a corresponding adjacent one of the sloping blades (e.g., 5-1 of FIG. 3) of the second blade assembly 5 to establish a substantially continuous and relatively long downwardly sloping surface area whereby to maximize propulsion and facilitate an efficient and smooth rotation of the propeller 1 through a fluid medium. What is more, the leading side 9 of the blade 3-1 of the first blade assembly 3 lies above the trailing side 21 of the blade 5-1 of the second blade assembly 5 such that the outermost tip of the leading side 9 lies in close proximity to and is almost touching the outermost tip of the opposite trailing side 21. Thus, and as is best shown in FIG. 4, a triangular space 45 is created by the leading side 9 of blade 3-1 and the trailing side 21 of the adjacent blade 5-1. The triangular space 45 establishes an air or water flow path between the blades (e.g., 3-1) of the first blade assembly 3 and respective adjacent ones of the blades (e.g., 5-1) of the second blade assembly 5 lying one above the other, whereby to advantageously reduce drag when the propeller is used to provide a driving propulsion force to a vehicle.

Likewise, and referring once again to FIG. 3, the trailing side 10 of each one of the blades (e.g., 3-1) of the first blade assembly 3 lies above and in parallel alignment with the leading side 26 of an adjacent one of the blades (e.g., 5-3) of the second blade assembly 5. By virtue of this alignment and the aforementioned triangular fluid flow path established between respective pairs 3-1 and 5-1, 3-2 and 5-2, and 3-3 and 5-3 of the first and second blade assemblies 3 and 5, the dual blade assembly propeller 1 of this invention is capable of pushing a greater volume of the fluid medium in which it is located than a conventional propeller having the usual single blade assembly.

Figure 6:
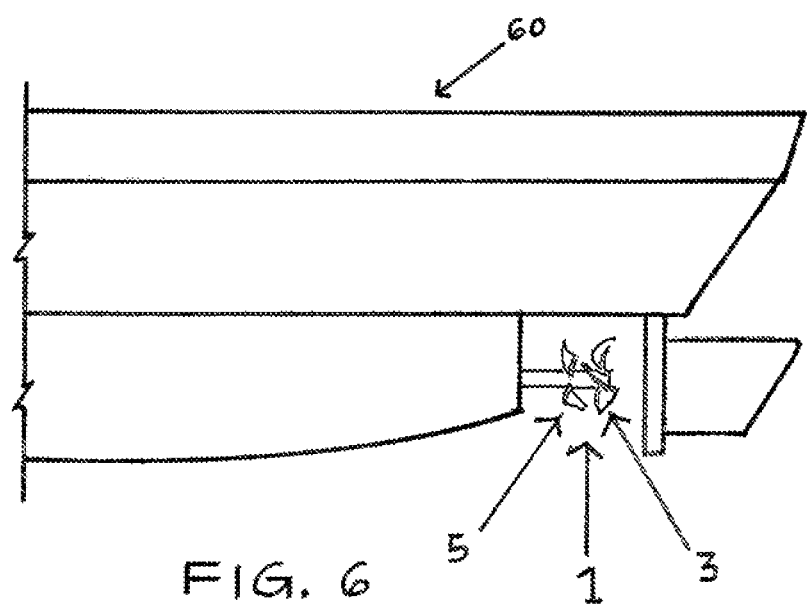
FIG. 6 illustrates one example of the multi-blade assembly propeller with the shaft thereof coupled to the stern of a ship to produce a force to drive the ship through water.

Turning now to FIG. 6 of the drawings, the dual blade assembly propeller 1 of this invention is shown having the complementary first and second blade assemblies 3 and 5 spaced from one another along the shaft 36 and coupled by shaft 36 to the stern of a ship 60 to be driven through water. However, as was pointed out above, the dual blade assembly propeller 1 can also be used to power other vehicles through different fluid mediums (e.g., air).

Figure 7:
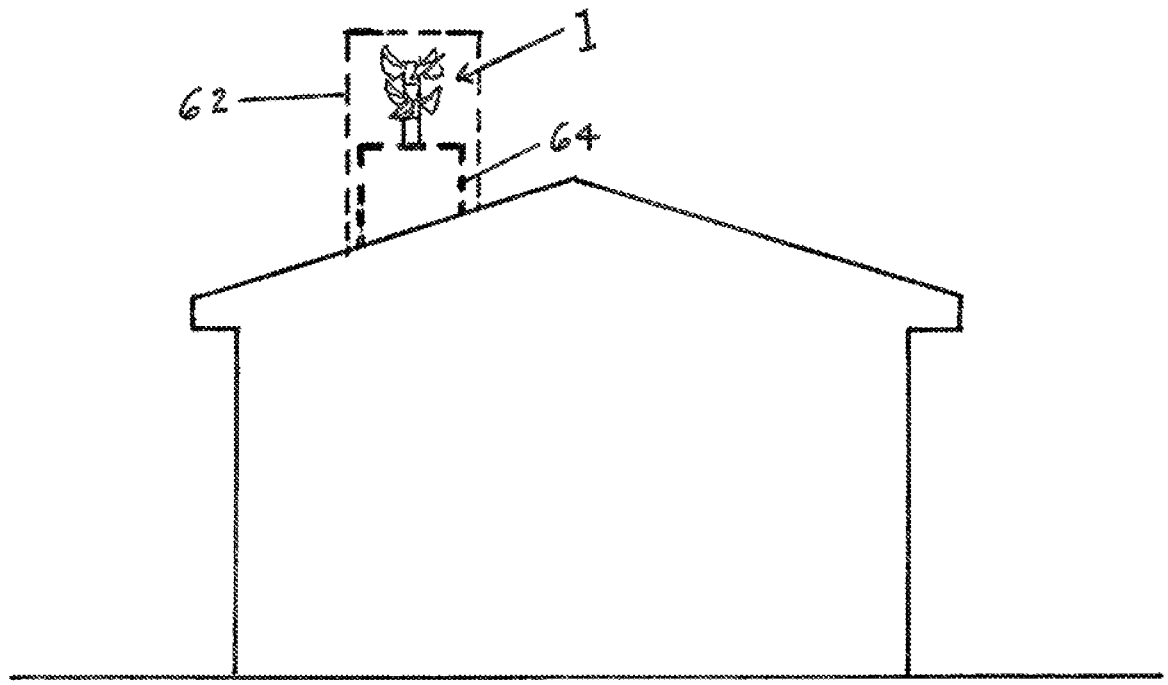
FIG. 7 illustrates another example of the multi-blade assembly propeller used as a windmill mounted on a rooftop with the shaft connected to a generator of electricity.

By way of example only, vehicles to which the dual blade assembly propeller 1 can be coupled include, but are not limited to, smaller boats (including submergible vessels), aircraft (including drones and helicopters), and land vehicles. The propeller 1 can also be located on a stand in a windblown field or mounted on top of a building to function as a windmill at which to impart a rotation to the shaft 36 to generate electricity. FIG. 7 of the drawings shows the propeller 1 located on a rooftop surrounded by a protective perforated enclosure 62. The shaft of the propeller 1 is coupled to a conventional generator 64 of the kind adapted to generate electricity in response to a rotation of the propeller. The size and curvature of the triangular blades 3-1 . . . 3-3 and 5-1 . . . 5-3 of the first and second blade assemblies 3 and 5 will depend upon the particular application of the propeller 1. Moreover, the direction of the curvature so as to be either convex or concave will also depend upon the ultimate application of the propeller.

To maximize the advantages achieved by the multi-blade assembly propeller 1 herein disclosed, the preferred down-sloping alignment of the blades 3-1 . . . 3-3 and 5-1 . . . 5-3 of the first and second blade assemblies 3 and 5 relative to the longitudinal axis 48 of the shaft 36 is now described while referring once again to FIG. 1. More particularly, each of the leading sides 9, 12, 15, 20, 23 and 26 of each blade is located higher along the shaft 36 and above the opposite trailing sides 10, 13, 16, 21, 24 and 27.

A first angle 56 of 70° is formed in a clockwise direction by the leading side (e.g., 9) of each blade (e.g., 3-1) of the first blade assembly 3 between a radial reference line 50 running therealong and the longitudinal axis 48 of the shaft 36. An identical second angle 57 of 70° is formed in a counter-clockwise direction by the trailing side (e.g., 10) of the same blade (e.g., 3-1) of the first blade assembly 3 between a radial reference line 52 running therealong and the longitudinal axis 48 of shaft 36.

A third angle 58 of 70° is formed in a clockwise direction by the leading side (e.g., 20) of each blade (e.g., 5-1) of the second blade assembly 5 between a radial reference line 54 running therealong and the longitudinal axis 48 of shaft 36. An identical fourth angle 59 of 70° is formed in a counter-clockwise direction by the trailing side (e.g., 21) of the same blade (e.g., 5-1) between a radial reference line 53 running therealong and the longitudinal axis 48 of shaft 36.

The invention claimed is:

1. A propeller to be rotated within a medium and comprising:
   a rotatable shaft;
   a first set of blades projecting outwardly from and rotatable with said shaft; and
   a second set of blades projecting outwardly from and rotatable with said shaft, said first set of blades lying above said second set of blades, and said first and second sets of blades being positioned relative to one another so that the blades of said first set thereof are out of phase and alternate with respect to the blades of said second set thereof,
   each blade of said first set of blades and each blade of said second set of blades sloping in the same direction relative to said shaft, and each of the sloping blades of said first and second sets of blades having a leading side and an opposite trailing side, with the leading side of each blade lying below the trailing opposite side thereof, and
   wherein the leading sides of the sloping blades of said first set of blades lie above and side-by-side the trailing sides of respective ones of the sloping blades of said second set of blades, such that a substantially continuous sloping surface is established between the trailing side of each sloping blade of said first set of blades and the leading side of each respective sloping blade of said second set of blades.

2. The propeller recited in claim 1, wherein the blades of said first set of blades projecting outwardly from said rotatable shaft are equally spaced from one another, and the blades of said second set of blades projecting outwardly from said rotatable shaft are equally spaced from one another.

3. The propeller recited in claim 1, wherein each blade of said first and second sets of blades is flared outwardly from said rotatable shaft, such that each blade has a narrow first end coupled to said shaft and an opposite wide second end spaced radially outward from said narrow end.

4. The propeller recited in claim 1, wherein the leading sides of the sloping blades of said first set of blades are aligned with the trailing sides of the respective ones of said sloping blades of said second set of blades so that an angle is created therebetween.

5. The propeller recited in claim 1, wherein the trailing sides of the sloping blades of said first set of blades lie above and in parallel alignment with the leading sides of the respective ones of said sloping blades of said second set of blades.

6. The propeller recited in claim 1, wherein said rotatable shaft has an axis extending longitudinally therethrough and wherein the leading side of each sloping blade of said first set of blades makes an angle running in a clockwise direction with the longitudinally extending axis through said shaft of 70°.

7. The propeller recited in claim 6, wherein the trailing side of each sloping blade of said first set of blades makes an angle running in a counter-clockwise direction with the longitudinally extending axis through said shaft of 70°.

8. The propeller recited in claim 1, wherein said rotatable shaft has an axis extending longitudinally therethrough and wherein the leading side of each sloping blade of said second set of blades makes an angle running in a clockwise direction with the longitudinally extending axis through said shaft of 70°.

9. The propeller recited in claim 8, wherein the trailing side of each sloping blade of said second set of blades makes an angle running in a counter-clockwise direction with the longitudinally extending axis through said shaft of 70°.

10. In combination:
    a vessel to be driven through a medium; and
    a propeller to be rotated in the medium to generate a propulsion force for driving the vessel through the medium, said propeller comprising:
    a rotatable shaft coupled to said vessel;
    a first set of blades being spaced from one another and projecting outwardly from said rotatable shaft to be rotated by said shaft and thereby generate the propulsion force;
    a second set of blades being spaced from one another and projecting outwardly from said rotatable shaft to be rotated by said shaft and thereby also generate the propulsion force, said second set of blades being positioned along said shaft to be spaced from said first set of blades so that said first and second sets of blades lie one above the other, and the blades of said first set thereof are out of phase and alternate with respect to the blades of said second set thereof,
    wherein each of the blades of said first and second sets of blades slopes in the same direction relative to said rotatable shaft, and wherein each of the sloping blades of said first and second sets of blades has a first end connected to said rotatable shaft, an opposite second end spaced from said rotatable shaft, a leading side and an opposite trailing side, the leading side of each sloping blade of said first set of blades lying above and side-by-side the trailing side of a respective one of the sloping blades of said second set of blades, such that the distance between the second end of each sloping blade of said first set of blades and the second end of each respective sloping blade of said second set of blades is less than the distance between the first end of each sloping blade of said first set of blades and the first end of each respective sloping blade of said second set of blades, whereby an angle is established between the leading side of each sloping blade of the first set of blades and the trailing side of each respective sloping blade of said second set of blades.

* * * * *